(12) United States Patent
    Oren et al.

(10) Patent No.: US 10,291,479 B1
(45) Date of Patent: May 14, 2019

(54) DISCOVERING A COMPUTER NETWORK TOPOLOGY FOR AN EXECUTING APPLICATION

(71) Applicant: LogicMonitor, Inc., Santa Barbara, CA (US)

(72) Inventors: Gadi Oren, Cambridge, CA (US); Ran Giboa, Cambridge, CA (US)

(73) Assignee: LogicMonitor, Inc., Santa Barbara, CA (US)

(*) Notice: Subject to any disclaimer, the term of this patent is extended or adjusted under 35 U.S.C. 154(b) by 0 days.

(21) Appl. No.: 16/219,793

(22) Filed: Dec. 13, 2018

(51) Int. Cl.
*H04L 12/24* (2006.01)
*G06F 9/455* (2018.01)
*H04L 12/26* (2006.01)

(52) U.S. Cl.
CPC .......... *H04L 41/12* (2013.01); *G06F 9/45558* (2013.01); *H04L 41/0233* (2013.01); *H04L 41/22* (2013.01); *H04L 43/08* (2013.01); *G06F 2009/45595* (2013.01)

(58) Field of Classification Search
CPC . H04L 29/08315; H04L 41/082; H04L 41/12; H04L 41/5058; H04L 45/02
See application file for complete search history.

(56) References Cited

U.S. PATENT DOCUMENTS

| | | | | |
|---|---|---|---|---|
| 2003/0009552 A1* | 1/2003 | Benfield | ............. | H04L 41/0213 709/224 |
| 2003/0156552 A1* | 8/2003 | Banker | ............... | H04L 25/4908 370/266 |
| 2004/0105459 A1* | 6/2004 | Mannam | ................... | H04J 3/14 370/465 |
| 2006/0048141 A1* | 3/2006 | Persson | ..................... | G06F 8/61 717/176 |
| 2009/0328033 A1* | 12/2009 | Kohavi | ................. | G06F 9/5027 718/1 |
| 2010/0027552 A1* | 2/2010 | Hill | ......................... | H04L 12/66 370/401 |
| 2018/0041555 A1* | 2/2018 | Manohar | ................. | H04L 12/44 |

* cited by examiner

*Primary Examiner* — Arvin Eskandarnia
(74) *Attorney, Agent, or Firm* — SoCal IP Law Group LLP; Steve C. Sereboff; Angelo Gaz

(57) ABSTRACT

There are disclosed devices, system and methods for continual automated discovering of a topology of a computer network of physical network objects for an application. A first physical network object selects portions of sets of data messages being sent over time by the application and related network objects; and collects network configuration and time dimension information, and timeseries information from the portions of messages. A second physical network object receives the information and uses it to determine topology information for the application over time, which includes unique keys of, types of objects of, types of relationships between pairs of, groupings of, time dimension data of and metrics data of the physical network objects. The topology information can be stored; and can be queried to create and display a graph representation of the topology information that changes over time.

20 Claims, 5 Drawing Sheets

US 10,291,479 B1

DISCOVERING A COMPUTER NETWORK TOPOLOGY FOR AN EXECUTING APPLICATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to discovering a computer network topology for an executing application.

Description of the Related Art

Current computer network topology mapping tools or devices are generally unable to automatically discover the topology of network objects of a network communicating with an application at a large scale, store the topology and allow quick access to the topology information. Some such tools require access to sensitive information. Some do not perform repeated discovery, compare changes, addressing large scale and dealing with missing critical data. Some do not automatically group resources (like a cluster or a service) or collect critical metrics for each network object. Such tools also do not provide a graph representation of the topology that mixes data that is not pure graphical and/or that has data with time dimension.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Technologies described herein provide systems and methods for continual automated discovering over time of a topology of network objects of a selected application executing on a computer communication network. The system may be an efficient information technology (IT) discovery engine existing as two physical network objects of the computer network that accesses the network object on which the application is executing. Herein, a network "topology" may be or include the network's "topology information."

Description of Apparatus

Figure 1:
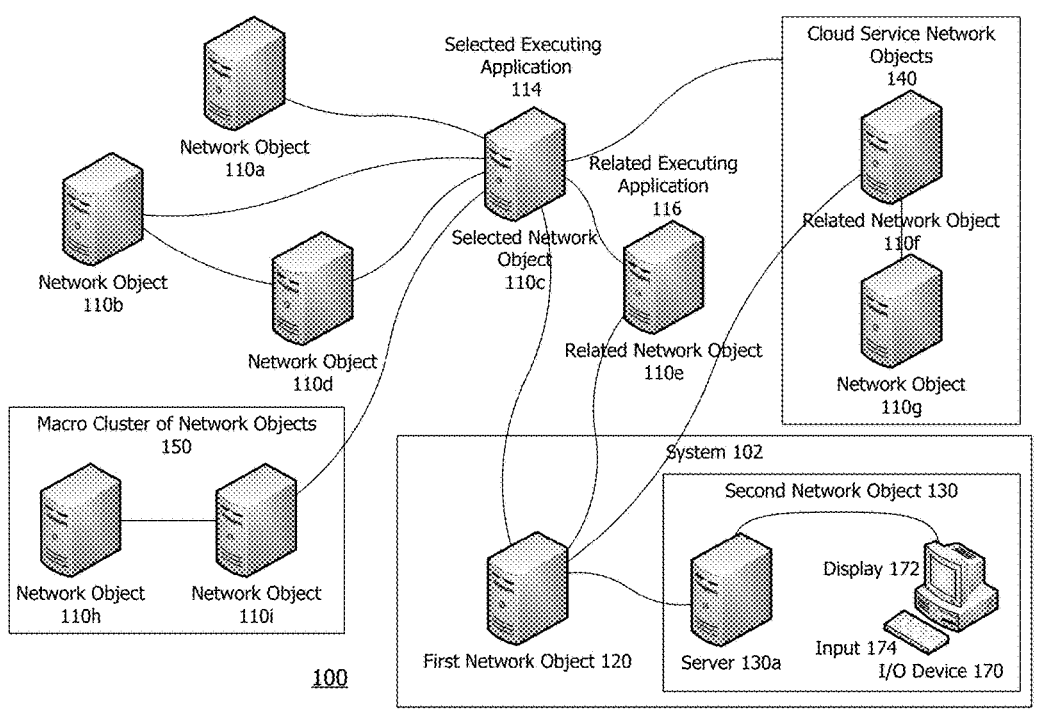
FIG. 1 is a computer communication network having a system for continual automated discovering over time of topology information for a selected application executing on a selected network object.

Referring now to FIG. 1, there is shown a computer communication network 100 having a system 102 for continual automated discovering over time of topology information; and/or displaying a graph representation of that topology information of network objects for a selected application 114 executing on a selected network object 110c. In some cases, the "discovering" of topology information also includes some manual intervention to input part of the topology information of one or more network objects. The computer communication network 100 is a computer network or network that includes the network objects 110a-110i, 120 and 130. The software application 114 is executing or running on the network object 110c. The related executing application 116 is executing or running on the network object 110e. The network objects 110a, 110b, 110d, 110c and 110e are independent or stand-alone network objects. The network objects 110f and 110g are part of a cloud service network objects 140. The network objects 110h and 110i are part of macro-components or a cluster group of network objects 150.

Each of the network objects 110a-110i, 120 and 130 may be a physical network object, a virtual network object or another network element. Any number of those network objects are related to the application 114 such as by influencing the execution of, receiving data from and/or sending data to the application 114. A physical network object or a type of physical network object is at least one of a physical host, a physical disk (e.g., within a server or attached to a server in a cloud situation), a physical load balancer, a server, a client, a physical internal service, a desktop, a router, a node, a network switch, a laptop or other computing device, such as device 500 FIG. 5. A virtual network object or type of virtual network object is at least one of a virtual host, a virtual disk, a virtual load balancer, a database, a logical clustered group of resources, a macro-component, a logical service, a virtual internal service, a virtual computing device, that exists on or is a device 500 FIG. 5. Each of the network objects may include at least one communication interface for communicating with at least one other network object, such as interface 516 in FIG. 5.

In some cases, application 114 has parts or plug-ins executing on another network object; or is communicating data with another network object. For example, network object 110e is related to object 110c and has related executing application 116 that is related to the application 114 because the applications 114 and 116 are communicating data with each other as a result of the execution of application 116. For example, the application 114 may be a server application which is sending webpage data to the application 116 which is a client application displaying the webpage to a user, and the topology for the server is being determined. It can be appreciated that this relationship of the applications 114 and 116 could be reversed and the system 102 would be mapping out the topology for the client computer. Also, the object 110f is related to the object 110c because the application 114 is obtaining data through the object 110f from a disc or database of the object 110g. For example, the object 110f may be a router or Internet switch which is routing advertisements from ad server source object 110g to the application 114. Other relationships between network objects are also considered as noted herein and the network objects related to application 114 will be included in the topology information.

The network 100 includes the network object 120 and the separate network object 130 which together are the system 102. The system 102 may include additional components. In one case, the objects 120 and 130 may be the same network object. The network object 130 includes the server 130a and may optionally include the user input/output (IO) device 170 having the display 172 and the user input 174. The server 130a may be a network object as noted herein. The device 170 may be a server, client, desktop, laptop or other computing device, such as noted for device 500 FIG. 5. The display 172 may be or include a computer display, touchscreen or other device capable of rendering or displaying computer graphics. The input 174 may be or include a computer input device, such as a keyboard, mouse, touchpad, touchscreen, voice activated input and/or the like.

The network 100 includes network connections between the network objects, as shown by the lines connecting pairs of the network objects. Specifically, the object 110c is connected to the objects 110a, 110b, 110c, 120, 140 and 110i. The object 110b is connected to the object 110d; the object 110i is connected to the object 110h; and the object 110f is connected to the object 110g. Each connection may represent a connection between the network interfaces of each of the objects being connected. Such connections may be or include network: connections communication channels, routers, nodes, network switches, hardware, software, wired connections, wireless connections and/or the like. In some cases, each connection may represent one of different types of relationships like a physical connection, a logical connection, a dependency relationship and/or any other type of relationship between the two objects. Each network connection may be capable of being used to communicate network data, packets, network messages, calls, signals, streams, arrays, flagged samples and feedback described herein.

The "selected" application 114 is an application, a component, and/or a network object of a network that it is desired to discover the network topology or topology information of. The network object 110c is a "selected" object such as by being the selected network object and/or a network object upon which the selected software application 114 is executing. For example, the network 100 may be an environment in which the system 102 can continually and automatically discover over time, a topology of the network 100 that is involved in execution of or accessed during execution of the selected application 114 which is executing on the network object 110c thus making object 110c a "selected" network object.

The selected application 114 may be selected by a user having access to system 102. The user may be an analyst, administrator, or other person; or a software application having access to the system 102. The input 174 of the input/output (I/O) device 170 may be used by the user to select (e.g., predetermine or identify) the selected application 114, that it is desired to discover the topology of. This selection may cause the system 102 to perform continual automated discovering over time of the topology of network objects for or communicating with the executing application 114. Discovering the topology may occur for a selected period of time and optionally for additional subsequent periods of time as noted herein.

Figure 2:
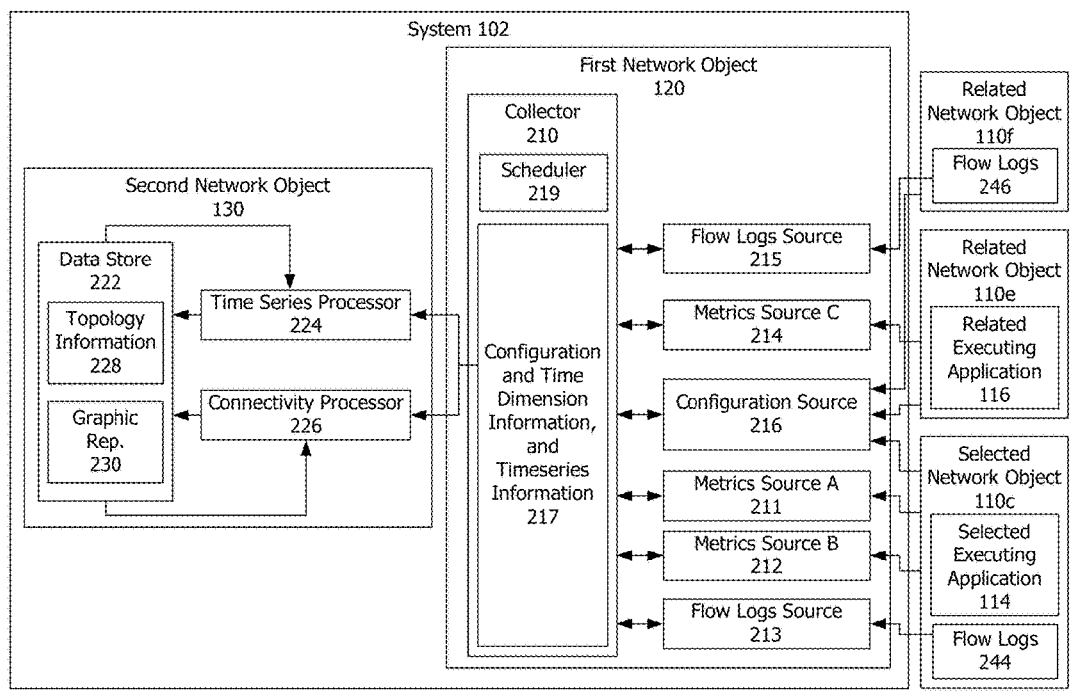
FIG. 2 is a portion of the network of FIG. 1 that includes the system for continual automated discovering and the selected executing application.

Referring now to FIG. 2, there is shown a portion 200 of network 100 that includes the system 102 and the selected executing application 114 executing on the network object 110c of FIG. 1. The network object 120 is connected by network connections to and between the network object 130 and: the selected network object 110c, the related network object 110e and the related network object 110f as shown.

The network object 120 includes at least a collector 210, a scheduler 219, configuration and time dimension information (CTD), and timeseries (TS) information 217, and two or more of sources 211-216 for sending the information 217 to the collector 210. Herein, the information 217 may be referred to in separate parts as a configuration and time dimension information (CTD) part, and a timeseries (TS) information part of the information 217. It may also be referred to together as the CTD and TS information 217. The two or more sources includes a configuration source and at least either a flow logs source or a metrics source. Additional sources may also be used to collect the information 217.

In some cases, there is one configuration source that is connected to each network object the collector 210 is collecting the information 217 from. The configuration source may collect configuration information regarding how each network object is configured that is used to produce the information 217. There is also a number of metric sources connected to any number of the network objects the collector 210 is collecting the information 217 from. Each metrics source may collect metrics information regarding a type of metrics for a network object that is used to produce the information 217. More than one metric source can be connected to any single network object to collect more than one type of metrics from that object. There is also a number of flow logs sources, each connected to any of the network objects the collector 210 is collecting the information 217 from. Each flow logs source may collect flow logs information for or from a network object that is used to produce the information 217. Each flow logs source can be reading or copying the flow logs of a switch, node or flow logs providing service.

As shown in FIG. 2, the object 120 has a metrics source A 211, a metrics source B 212, a flow logs source 213, and a configuration source 216 for collecting the information 217 from the selected object 110c and/or the selected application 114. More specifically, the configuration source 216 is connected by network connections to and receives configuration information from the selected object 110c as part of the information 217. It may detect configuration information of or for the selected object 110c based on the execution of the application 114 and send that configuration information to the collector 210. For example, configuration source 216 may be collecting configuration information such as text identifying internet protocol (IP) addresses, logical media access control (MAC) address, physical MAC address, internal disc types, CPU types, random access memory (RAM) memory types, read only memory (ROM) data, switch/node configuration data, switch data routing data, and other configuration data of each network object.

Next, the metrics source A 211 and the metrics source B 212 are connected by network connections to and receive metrics information from the selected object 110c as part of the information 217. They may collect and send to the collector 210 two different types (e.g., type A and B) of metrics information as based on the execution of the application 114. For example, the metrics source A 211 may be collecting the metrics information of the memory, computer processing unit (CPU) and inputs/outputs (IOs) performed by one hard drive (e.g., by disk 1) of the object 110c; while the metrics source B 212 is collecting the metrics information of the inputs/outputs (IOs) performed by a second hard drive (e.g., by disk 2) of the object 110c.

Also, the flow logs source 213 is connected by network connections to and receives data from the flow logs 244 of or within the selected object 110c as part of the information 217. In some cases, as noted further below, each flow log of the logs 244 may include data in all or some of the following fields: version, account-id, interface-id, srcaddr, dstaddr, srcport, dstport, protocol, packets, bytes, start, end, action, log-status. The source 213 may read the flow logs 244 and send all or part of those logs as flow logs information to the collector 210. For example, the flow logs source 213 may be collecting or reading flow logs information including the source network object (e.g., source IP address), target network object (e.g., target IP address) and possibly type of communication of the communication messages of the flow logs for the network communication traffic at or flowing through the object 110c. As noted, the network object 110e is related to the object 110c due to data communication between applications 114 and 116. Thus, the flow logs information of information 217 collected from the object 110c may include flow logs 244 of the communication between the applications 114 and 116, and/or the objects 110c and 110e. Also, as noted, the network object 110f is related to the object 110c because the application 114 is obtaining data from the object 110g through the object 110f. Thus, the configuration information and/or metrics information of information 217 collected from the object 110c may include information related to the communication between the objects 110c and 110f.

Further, as shown in FIG. 2, the object 120 has a metrics source C 214, and the configuration source 216 for collecting the information 217 from the related object 110e. The metrics source C 214 is connected to and receive metrics information from the related network object 110e; and send that as the TS part of the information 217 to the collector 210 such as noted for the metrics sources A 211 and B 212 collecting the metrics information of the object 110c. The configuration source 216 is connected to and receives configuration information from the related object 110e; and sends that as the CTD part of the information 217 to the collector 210 such as noted for the configuration source 216 collecting the configuration information of the object 110c. As noted, the network object 110e is related to the object 110c because the application 114 is a server application which is sending webpage data to the application 116 which is a client application displaying the webpage to a user. Thus, the configuration information and/or metrics information of information 217 collected from the object 110e may include information related to the communication between the objects 110c and 110e.

In addition, as shown in FIG. 2, the object 120 has a flow logs source 215 and the configuration source 216 for collecting the information 217 from the related object 110f. The flow logs source 215 is connected to and receives flow logs information from the flow logs 246 of the related network object 110f; and sends that as part of the CTD part of the information 217 to the collector 210 such as noted for the flow logs source 213 reading the flow logs 244 of the object 110c. The configuration source 216 is connected to and receives configuration information from the related object 110f; and sends that as part of the CTD part of the information 217 to the collector 210 such as noted for the configuration source 216 collecting the configuration information of the object 110c. As noted, the network object 110f is related to the object 110c because the application 114 is obtaining data from the object 110g through the object 110f.

Thus, this flow logs information of information 217 collected from the object 110f may include flow logs 246 of the communication between the objects 110c and 110f.

The sources 211-216 are connected to receive the source information (e.g., configuration information, flow log information and metrics information) from the network objects; and transmit the information to collector 210 as the information 217. The information 217 may be periodically transmitted by the sources to the collector, such as tens or hundreds of times during each selected period of time (e.g., see 360 of FIG. 3).

Each of the sources 211-216 may be a pluggable application program interfaces (API) source. In some cases, each of the sources 211-216 is a "pluggable" data source or collector that can be deployed in runtime or during operation of the system 102 to enable process 300 of FIG. 3 to be performed for various examples of the network 100, the selected application 114, the period of time, the subsequent period of time, and the time between an end of the period of time and a beginning of the subsequent period of time. Using pluggable sources also allows those sources to be deployed by the system 102 during subsequent periods of time to expand the system 102 or fix pluggable sources that do not function correctly. This can enable non-disruptive break/fix cycles for the system 102.

Figure 3:
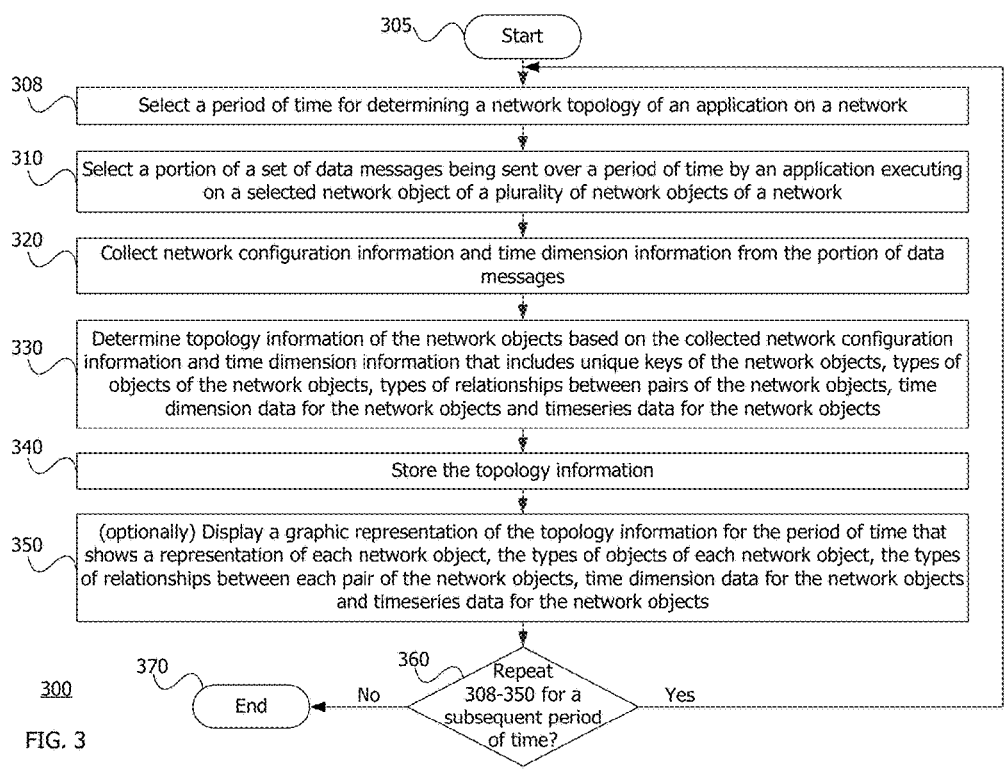
FIG. 3 is an operating environment/process for continual automated discovering of the topology information of the selected executing application of the computer communication network.

The collector 210 also includes a scheduler 219 for scheduling time periods for and determining whether to automatically repeat the continual automated discovering of the topology information (e.g., see 360 of FIG. 3). In some cases, the scheduler 219 exists on the object 130 and/or as part of data store 222. The collector 210 also includes the CTD and TS information 217 determined based on the source information collected from sources 211-216; and for being sent to the network object 130. The information 217 may be periodically transmitted by the collector to the network object 130, such as tens or hundreds of times during each selected period of time (e.g., see 360 of FIG. 3).

The network object 130 includes at least a data store 222, a time series processor 224 and a connectivity processor 226. The time series processor 224 and connectivity processor 226 are connected by network connections to and receive information 217 from the collector 210 as shown.

In some cases, a network configuration and time dimension information (CTD) part of the information 217 from the sources 211-216 is the configuration information collected by source 216 and the flow logs information collected by the source 213 for the application 114 and the network objects related to the application 114. In these cases, the CTD part of the information 217 is sent to the connectivity processor 226, which processes that information to determine or create unique keys of, types of objects of, types of relationships between pairs of, groupings of and time dimension data of the network objects part of the topology information 228. The time dimension data may show and/or show changes over time in the topology configuration or topology information 228 over time, such as changes in the existence of, types of objects of, types of relationships between pairs of, and groupings of the network objects. It is considered that in certain cases, the TS part of the information 217 may also be processed by the processor 226 to determine or create unique keys of, types of objects of, types of relationships between pairs of, groupings of and time dimension data of the network objects part of the topology information 228.

In these cases, the timeseries information (TS) part of the information 217 from the sources 211-216 is the metrics information (e.g., timeseries data) collected by metrics sources 211 and 212 for the application 114 and the network objects related to the application 114. In these cases, this TS part of the information 217 is sent to the time series processor 224, which processes that information to determine or create timeseries data part of the topology information 228. The timeseries data may show and/or show changes over time in the performance metrics of the network objects of the topology configuration or topology information 228. It is considered that in certain cases, the CTD part of the information 217 may also be processed by the processor 224 to determine or create the timeseries data part of the topology information 228.

The time series processor 224 and the connectivity processor 226 are also connected to and transmit the topology information 228 to the data store 222 based on or determined from the information 217 received from the collector 210 and data received from the data store 222 as shown. This topology information 228 may be periodically transmitted from processors 224 and 226 to the data store 222 as noted for periodic transmission of information 217.

The data store 222 includes the stored topology information 228 that is received from the time series processor 224 and the connectivity processor 226. The data store 222 also includes graph representations 230 for displaying (e.g., creating and/or displaying) various graph representations of topology information 228.

The data store 222 is connected to and transmits the topology information 228 back to the time series processor 224 and the connectivity processor 226. For example, the processing of the information 217 performed by processors 224 and 226 to determine topology information 228 may depend on (1) the new data coming in as information 217, and (2) the state of the topology information 228 is it currently exists and as it was in the past. The information about the past state of topology information 228 is already stored in the data store 222, such as as past versions of topology information 228. The state of the topology information 228 is it currently exists and as it was in the past flows along the two arrows from 222 to 224 and 226. This topology information 228 may be periodically transmitted from the data store 222 to processors 224 and 226 as noted for information 217.

The network object 120 may represent a first "agent" such as hardware and/or software executing on a first network object or in a first "cloud". A cloud is one or more servers or sets of computing devices that are located separately from each other, such as across a network interface or connection. The network object 130 may represent a second "agent" such as hardware of and/or software executing on a second network object or in a second "cloud".

The first and second network objects or agents communicate with each other to perform the continual automated discovering of the topology for the executing application 114. In some cases, the object 120 or the first agent may be described as a state maintaining or service provider side or cloud of the system; and the object 130 or the second agent may be described as a remote or customer side or cloud of the system. In one example, the objects 120 and 130 are generic physical network object architectures that achieve detecting the topology information in a way that is independent of a specific cloud provider, such as the Amazon Cloud™, Microsoft Cloud™ or Google Cloud™. In this case, the object 110c may be cloud based, such as including a cloud based router, switch or flow logs providing service (e.g., cloud provider service by Google Cloud™) and the flow logs are virtual private cloud (VPC) flow logs for network communication being performed by the object 110c.

In some cases, the objects 120 and 130 are not limited to being implemented in a cloud. They can function very well with an on-premise or local area network (LAN) installation. In this situation instead of using flow logs source 213 and 215 to read flow logs, those sources could read equivalent "flow logs" of a local switch, router, service and the like which are very similar to VPC flow logs and can be produced by some hardware switches.

Using the system 102 and the connections shown it is possible to perform continual automated discovering over (e.g., during) a selected period of time (and optionally subsequent periods of time) of the topology of network objects for the selected executing application 114. Displaying the graph representation of the topology is one type of use of the discovered topology information 228. In addition to that functionality of visualization, the topology information 228 has other important uses. Specifically, the topology information 228 includes a representation of knowledge on how the application 114 works internally with respect to its interaction and communication with other (e.g., "related") network objects. The topology information 228 can be a model usable to analyze situations where the application 114 is not working correctly and to help identify why it is not working correctly using additional information such as measured metrics of different related network objects of the network 100.

Description of Processes

Referring now to FIG. 3, there is shown an operating environment/process 300 for continual automated discovering over a selected period of time of the topology information of network objects for the selected executing application 114 of the computer communication network 100. The process 300 may be or describe an operating environment in which the system 102 can perform the continual automated discovering. The process 300 may be performed by the system 102. The process 300 starts at 305 and can end at 370, but the process can also be cyclical as shown by the "yes" loop from 360 to 310, which provides discovering of topology information in a "continual automated" manner. The process 300 may be performed after selecting object 110c and/or application 114. It can be appreciated that the process 300 can be repeated to determine the topology information 228 and/or graphic representations 230 for selected objects or applications, other than selected object 110c and/or application 114. For example, during the period of time or another period of time, another one of collector 210 can be used by object 120 to perform the process 300 to determine the topology information 228 and/or graphic representations 230 for a selected object or application in network 100, other than selected object 110c and/or application 114.

After 305 where process 300 starts, the process continues to 308 where a period of time is selected for determining a network topology of an application executing on a network. This is selecting the "selected" period of time noted above and increases computer efficiency because there is a gap in time between such selected periods of time (e.g., see at 360) during which the topology does not need to be determined. Selecting the period of time at 308 may be performed automatically by the scheduler 219; or manually by a user at input 174. Selecting at 308 may be part of selecting the period of time, the subsequent period of time, and a time between an end of the period of time and a beginning of the subsequent period of time at noted at 360. This selecting a period of time may be used by the collector 120 to program or control the sources 211-216 to collect the information 217 only during the period of time and/or subsequent periods of time.

After 308, at 310 a portion is selected of a set of data messages being sent during or over the selected period of time of 308 by a selected application 114 executing on a selected network object of a plurality of network objects of the network 100. Selecting at 310 may be selecting a portion of a set of data messages being sent and being received during the selected period of time of 308 by a selected application 114.

In some cases, selecting the portion at 310 includes selecting between 2 and 10 percent of the set of data messages of the selected software application 114. In other cases, selecting the portion at 310 includes selecting between 5 and 25 percent of the set of data messages. Selecting at 310 may be selecting a portion of a set of data messages being sent or that have been sent over the period of time by the application 114. This selecting may be performed by collector 210 and may be used by the collector 120 to program or control sources 211-216 to collect the information 217 only for the selected portion of the set of data messages.

Selecting a portion at 310 may include the collector 210 parsing the set of data messages based on at least one statistical analysis that identifies trends in data message flow direction and convergence between the application 114 and the other network objects; then selecting the portion of the set of data messages based on the trends. The statistics may include statistics about flow records that are similar, count, average and sum the number of packets and bytes.

Selecting a portion at 310 increases computer efficiency because it avoids reading all the logs 244 of the set of messages by sources 211-216 or into the collector 210. Reading all of the logs may create an undesirable network load in or at application 114, the network object 110c and/or a virtual private cloud (VPC) and/or network of that application or object. In addition, selecting a portion may avoid sending all the logs 244 or raw data for or all of the logs 244 from the collector 210 to the network object 130. Sending all the logs or raw data can be redundant and potentially overload the entire system 102. This overloading may overload both of the network objects 120 and 130 with data transmissions thus slowing or stopping processing or performance.

In some cases, in addition to selecting a portion of the set of messages for the application 114, selecting at 310 also includes selecting another portion of another set of data messages being sent and/or received during the selected period of time by a related application and/or network object. For example, selecting 310 could include also selecting portions of the sets of data messages sent and received by the related application 116 and/or the related network object 110f, similar to the selecting a portion of the set of messages sent by the application 114.

After 310, at 320 the network CTD and TS information 217 is collected from the portion of data messages from 310. The network object 120 may perform this collecting. Specifically, this collecting may be performed by the sources 211-216 reading or receiving source information from the executing application 114 and/or the selected object 110c. Collecting at 320 may also include the sources 211-216 reading the communication flow logs (e.g., the flow logs 244) of the selected network object 110c, where each flow log is associated with a data message received or transmitted by the selected executing application 114. Reading by the sources 211-216 may be controlled by the collector 210. For example, the controller 210 may cause sources 211-216 to only read information 217 for the portion of messages selected at 310; and to only read information 217 during the period of time selected at 308, and optionally during one or more subsequent periods of time (e.g., see at 360).

For example, based on the data read from the flow logs 244, the executing application 114 and/or the selected object 110c, the configuration source 216 may detect the configuration information part of some of the CTD part the information 217 of the network object 110c. Next, based on the data read from the flow logs 244, the executing application 114 and/or the selected object 110c, the flow logs source 213 may detect the flow logs information of some of the CTD part of the information 217 of the network object 110c. Also, based on the data read from the flow logs 244, the executing application 114 and/or the selected object 110c, the metrics sources 211 and 212 may detect the metrics information of the TS part of the information 217 of the network object 110c.

In some instances, to determine topology information 228, only the network object 120 is collecting the information 217 from the network 100, thus, the object 120 is collecting the information 217 in an "agent-less" fashion. As compared to an agent-based collection, this agent-less fashion increases computer efficiency because it avoids having a collecting agent or collection resource located on each network object, resource or host of the network 100.

When collecting at 320, the API sources 211-216 may use a remote access source such as remote desktop services to access the selected network object 110c and read data from the application 114 and the communication flow logs 244. Using remote desktop services increases computer efficiency because it allows the object 120 to access the application 114 and the communication flow logs 244 (e.g., access object 110c) using low level permissions as compared to a collection using mid or high-level permissions. In some instances, the object 120 access to the application 114 only requires a low level of permissions and avoids needing administrator or root level permissions to the minimum amount required to collect information 217.

Each flow log of the logs 244 may include data in all or at least the first 8 of the following fields: version, account-id, interface-id, srcaddr, dstaddr, srcport, dstport, protocol, packets, bytes, start, end, action, log-status. Here, any of the sources 211-216, the collector 210, the processor 224 and/or the processor 226 (e.g., see at 330) can use the data in srcaddr, srcport and dstaddr, dstport to determine the information 217 or the topology information 228 including to determine the source network object (e.g., source IP address), target network object (e.g., target IP address) and possibly type of communication of the communication message of that log. The source network object (e.g., source IP address) and target network object (e.g., target IP address) may be determine when IP addresses that show up in the flow log (srcaddr, dstaddr) are both familiar. The type of communication may be determined based on the ports used by that communication identified in the log, because different applications traditionally use specific ports (for e.g. MySQL™ is using port 3306 by default). Collecting and using the information 217 from the flow logs 244 increases computer efficiency because it allows the sources 211-216 to determine the topology information 228 for the information 217 collected from a single application 217.

In some cases, the flow logs 244 read by the flow logs source 213 only identify a source network object IP address and a target network object IP address for some of the data messages. This may happen when the flow logs 244 are read from a flow log service of a cloud configuration. For these messages, the identified IP addresses identified by the source 214 can be sent by the controller 210 to the object 130 in the information 217. However, this leaves a portion of the data messages for which the flow logs 244 read by the flow logs source 213 do not identify any or all of a source network object IP address or a target network object IP address. For this portion of messages, the configuration source 216 can obtain and/or the processor 226 can determine (e.g., see at 330) the IP addresses of the source and/or target network objects based on the type of the network object that the source 216 detects in the configuration information it reads from those objects. Here, the IP addresses identified and/or configuration information for determining those addresses can be sent by the controller 210 in the configuration part of information 217. Using the configuration source 216 to determine the IP addresses that were not determined by the flow logs source 213 increases computer efficiency because it provides the source and/or target network object IP addresses that would otherwise not be available.

The collector 210 may send the connectivity processor 226 the network CTD part of information 217 which includes or can be used to identifying unique keys of the network objects, IP addresses of the network objects, types of objects of the network objects, types of relationships between pairs of the network objects, groups of the network objects and time dimension data for the network objects in the topology for the executing application 114 during the selected period of time. The collector 210 may also send the time series processor 224 the TS part of information 217 which includes or can be used to identify timeseries data for the network objects in the topology for the executing application 114 during the selected period of time.

In some cases, collecting at 320 includes the network object 120 transmitting or sending to the network object 130, only a portion of the information 217 collected from the portion of data messages. In some instances, the sources 211-216 read the information 217 from the communication flow logs 244 and send that information to the collector 210. The collector 210 then time stamps the read information 217. It also creates statistics about the time stamped information 217. The statistics may include statistics about flow records that are similar, count, average and sum the number of packets and bytes. In some cases, the collector 210 can create, maintain or store statistics about flow records of the logs 244 that are similar (srcaddr, srcport and dstaddr, dstport), count, average and sum the number of packets and bytes to reduce what is stored at the object 120, or sent by the object 120 in the information 217 to the object 130. This allows for a highly efficient, and yet simple way of filtering the flow logs sent by the collector 210, which increases computer efficiency because it reduces the amount of data sent to the object 130.

For example, based on the statistics, the collector 210 can filter the time stamped information 217 to remove redundant information; and then transmit the filtered information 217 to the network object 130. The collector 210 may send the connectivity processor 226 the filtered network CTD information for the executing application 114 during the selected period of time. The collector 210 may also send the time series processor 224 the filtered TS information for the executing application 114 during the selected period of time.

In some instances, during collection of the information 217 or determining of topology information 228, the only communication between the objects 120 and 130 is the one-way transmission of the information 217 from the object 120 to the object 130. By only communicating one-way, there are fewer restrictions and/or permissions required by the application 114 (or the object 110c) from the object 120 (e.g., for access to and collection of the information 217) because the information 217 is being communicated away from or is going outside of the application 114. This going outside case increases computer efficiency because the application 114 usually has a less restrictive firewall setting and requires less internal approvals from the object 120; as compared to if the object 120 is sending data to or writing to the application 114 or the object 110c.

In some cases, in addition to collecting a portion of the set of messages sent by the application 114, collecting at 320 also includes collecting the CTD and TS information 217 from other portions of data messages sent by a related application and/or network object. For example, collecting at 320 could include collecting CTD and TS parts of information 217 from portions (e.g., see selecting at 310) of the sets of data messages sent by the related application 116 and/or the related network object 110e, similar to the collecting a portion of the set of messages sent by the application 114 and/or the object 110c. Here, configuration source 216 collects the configuration information of the application 216 and/or the object 110e; and the metrics source C 214 collects the metrics information of the application 216 and/or the object 110e.

Also, collecting at 320 could include collecting CTD and TS information 217 from portions (e.g., see selecting at 310) of the sets of data messages sent by a related application by (or through) and/or by the related network object 110f, similar to the collecting a portion of the set of messages sent by the application 114 and/or the object 110c. Here, configuration source 216 collects the configuration information of the flow logs 246 and/or the object 110f; and the flow logs source 215 may also collect the flow logs information of the flow logs 246 and/or the object 110f.

After 320, at 330 the topology information 228 of the network objects related to application 114 is determined over the period of time based on the collected CTD and TS information 217. This determining may include continual and automated discovering and parsing over time of the topology of the network objects for or related to the executing application 114. Determining at 330 may be performed by the connectivity processor 226 processing the network CTD part of the information 217 sent by the collector 210 to create the connectivity part of the information 228 and/or by the time series processor 224 processing the TS part of the information 217 sent by the collector 210 to create the timeseries part of the information 228.

For example, the connectivity processor 226 determines from the received CTD part of the information 217, the connectivity part of the information 228 which may include the unique keys of the network objects, the types of objects of the network objects, the types of relationships between pairs of the network objects, the groupings of the network objects and time dimension data for the network objects related to the executing application 114. The time dimension data may show changes over time in the connectivity part of the information 228, such as changes in the existence of, types of objects of, types of relationships between pairs of, and groupings of the network objects related to the application 114 during the period of time. It is considered that in certain cases, the TS part of the information 217 may also be processed by the processor 226 to determine or create the connectivity part of the topology information 228.

Also, the time series processor 224 determines from the received TS part of the information 217, the timeseries (e.g., metrics) part of the information 228 for the network objects related to the executing application 114. The timeseries data may show the and/or show changes over time in the timeseries part of the information 228, such as changes in the performance metrics of the network objects related to the application 114 during the period of time. It is considered that in certain cases, the CTD part of the information 217 may also be processed by the processor 224 to determine or create the timeseries part of the topology information 228.

The determined topology information 228 at 330 can be stored in the data store 222 as noted at 340 and/or displayed in a graph representation as noted at 350.

In some cases, determining the topology information 228 at 330 also includes the connectivity processor 226 sending the processed connectivity part of information 228 (e.g., what the processor 226 determines from the received CTD part of the information 217) to the data store 222; and receiving from that store 222 current and/or prior determined connectivity information (e.g., a stored model of a prior connectivity part of the topology for the application 114 at a prior point in time). The connectivity processor 226 then determines the connectivity part of the information 228 using the configuration part of the information 217 received from the collector 120 and the prior connectivity information part of topology information 228 received from the store 222. Similarly, determining the topology information 228 at 330 may also include the time series processor 224 sending the processed timeseries part of information 228 (e.g., what the processor 224 determines from the received TS part of the information 217) to the data store 222 and receiving from that store 222 current and/or prior determined timeseries information (e.g., stored timeseries data for a prior topology for the application 114 at a prior point in time). The time series processor 224 then determines the timeseries part of the information 228 using the time series part of the information 217 received from the collector 120 and the prior timeseries information part of topology information 228 received from the store 222. Receiving the information from the store 222 increases computer efficiency because it allows the processors 224 and 266 to compare and identify differences over time between recently received versions of the information 217 and the stored prior information 228 received from the store 222. In some instances, determining at 330 may include determining the topology information 228 of an average network with 200 hosts (e.g., network objects) within 15 minutes at an accuracy of 70% and within additional 45 min (total 60 min from start) at an accuracy of 95%, meaning that 95% of the connections between network objects of the topology of the executing application will be discovered.

Figure 4:
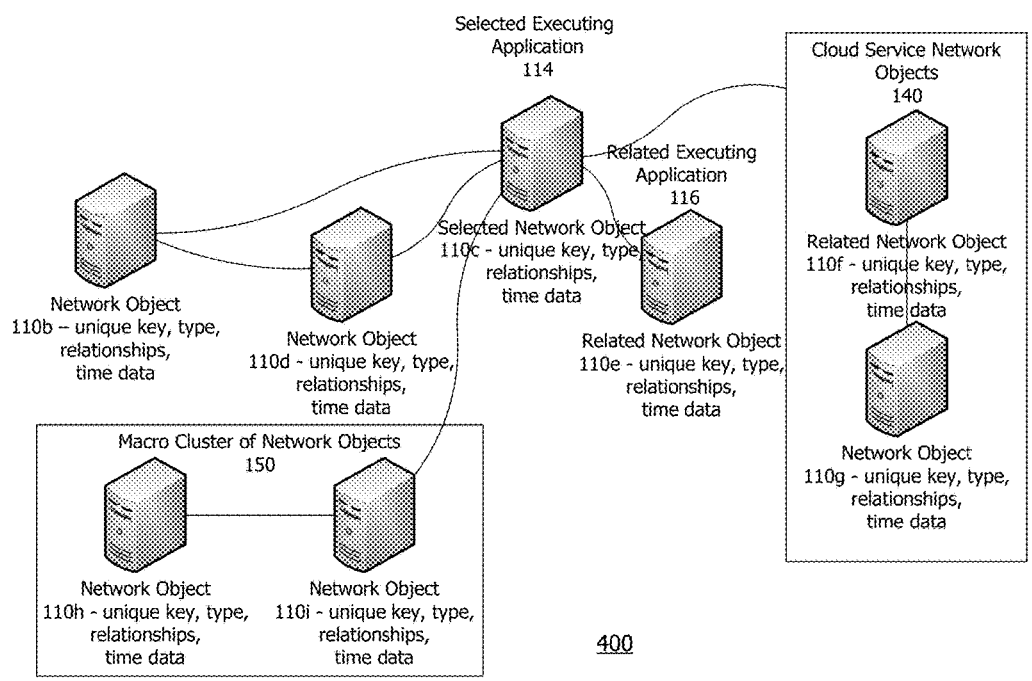
FIG. 4 shows a graph representation of topology information of the computer network for the selected application for a period of time.

Determining the topology information 228 at 330 may include determining the physical network objects, virtual network objects, software applications and/or hardware for each network object that the selected application 114 is related to, communicating with, as well as for the selected application 114. In some cases, at least network objects 110e and 110f are related to object 110c as noted above. For example, the topology information 228 may be for the selected application 114 and/or network object 110c and show the network objects communicating with or having a relationship with the selected application 114 and/or network object 110c due to execution of the application 114, such as shown in FIG. 4.

The determined topology information 228 may be unique keys of the network objects, types of objects of the network objects, types of relationships between pairs of the network objects, groupings of the network objects, time dimension data for the network objects (e.g., the connectivity part of the information 228), and optionally timeseries data (e.g., metrics data or the timeseries part of the information 228) of any network objects that are discovered or determined to be part of the topology information 228 of the network 100 for the executing application 114 during the period of time.

The unique key of a network object may be one (a single) key that uniquely identifies each network object from the others. Each key may be determined or selected by the connectivity processor 226 from or based on the configuration part of the information 217 received from the collector 210 and of the topology information 228 received from the store 222 by the connectivity processor 226. In some cases, every network object of the topology information 228 has at least one unique key and may possibly have multiple "keys" that are completely unique. A unique key cannot be repeated or reused within a single network object and cannot be used in or for more than one network object of the topology information 228 (e.g., because that would lead to these two objects to be merged into a single object).

As information 217 is collected for the network objects, each object is given unique key by processor 226 on a case by case basis. The unique keys are derived by the processor 226 per specific network object from what of the topology information 228 can represent this object in a unique way, within the specific technology domain of the network 100. Every new object and/or object's technology that is added to the topology requires the processor to make a decision about what key (or set of keys) should be used for this situation and/or object. In some cases, if it is available, the key is a fully qualified name (FQN) of a server. In cloud systems (e.g., cloud objects 140), usually the cloud provider has or provides specific keys that represents each object which can be used as a unique key. For example, AWS (Amazon Cloud™) has a set of internal unique keys (e.g., ARN—Amazon-Resource-Name) per each network object of a network that the processor 226 can use as the unique keys. Similar sets of keys from other cloud providers such as Microsoft Cloud™ or Google Cloud™ can be used. In a different domain, such on-premise the processor 226 can use logical media access control (MAC) addresses and/or physical MAC addresses from networking or other identification keys from technologies such as VMWare™ or other virtualization and cloud computing software. In some cases, a fully qualified uniform resource locator (URL) may be used. It can be appreciated that a mixture of the above noted keys, or other data of information 217 can be selected or used to create the unique key for each of the network objects of topology information 228.

It is worth noting that while IP address is an attribute of some of the network objects, it may not be good to use as a unique key for various reasons. First, because it is very easy to setup networks where the same IP address is used in different parts of the network. Furthermore, some objects do not strictly have an IP address but use another addressing system (e.g. a disk, or elements that are connected via other communication method that is not based on TCP/IP). Also, a network object may have multiple IP addresses (e.g., in the case of a server) or no IP addresses at all (e.g., if the network object is an internal element such as a disk drive). Thus, while IP address can be used as a key, in many cases it cannot be used as a unique key because IP addresses can be replicated based on target network configuration, can be easily spoofed and do not represent all types of objects. However, IP addresses can be stored and referenced by the processors 224 and 226 as helpful reference meta information, of "nice to know".

A type of object of a network object may be a type of physical network object and/or a type of virtual network object as noted herein.

A type of relationship may broadly be a network relationship, a data relationship, a functional relationship between pairs of the network objects. In some cases, a type of relationship between pairs of the network objects may be a network object controlling actions performed by another network object, a network object communication with another network object, a network object depending on another network object in order to operate correctly, and/or a network object streaming data to another network object. However, these examples of relationships are not limiting. Any type of relationship can be expressed including relationships that are newly discovered by the processor 226 and were not previously programmed into that processor.

Time dimension data for a network object may be data that describes changes of that object over time. In some cases, the time dimension data may describe the occurrence and timing of the addition, existence and departure of network objects from the topology information 228 over the period of time. This description can be determined using or based on the CTD and/or TS part of the information 217.

For example, the CTD part may be used by the processor 266 to determine time dimension data including the existence and properties of the network objects over the time period. This may include the processor 226 and/or data store 222 keeping topology information 228 over the period of time that includes time related notes of the events of when a network object was created or stopped existing as well as when certain properties of that object changed. This part of the information 217 can be queried by a user, within a required time range or the period of time. This may also include the processor 226 and/or data store 222 keeping topology information 228 that includes time related notes of when relationships between pairs of network objects began, changed and ended. These relationship notes can all be kept with a timestamp with relation to the network objects so this part of the topology information 228 can be later queried by a user, within a time range.

In some cases, the timeseries part of topology information 228 for a network object may be data that describes changes in metrics for that object over time of network objects in the topology information 228. For example, the TS part of the information 217 may be used by the processor 224 to determine timeseries part of the information 228 including the different metrics signals of the network objects over the time period. This may include the time series processor 224 and/or data store 222 keeping topology information 228 that includes time related notes of the timeseries data of measured signals (e.g., collected at 320) that relate to each network object. The timeseries notes of the timeseries part of the information 228 are obviously related to a time and this part of the information 228 can be queried by a user, based on a time interval.

As part of determining the topology information 228 at 330, the network object 130 or the processor 226 may maintain a list of IP addresses and/or unique keys of the network objects received in the information 217; and determine if an IP address and/or unique key of a network object changes over time based on comparing the IP address and/or unique key of that object in the list with subsequently IP addresses and/or unique keys for that object received in the information 217. Determining the topology information 228 at 330 can include comparing this list over time to determine IP address and/or unique key changes of the network objects, types of relationship changes between pairs of the network objects, time dimension data and timeseries data for the network objects during the period of time. Using this list and comparison increases computer efficiency because it more accurately determines the topology information 228 for network objects that having changing IP addresses and/or unique keys, such as cloud services that rotate IPs periodically; and helps the sources 211-218 create a continuous stable connectivity with the network objects.

In some cases, part of determining the topology information 228 at 330 includes determining the types of network objects and/or the types of relationships between pairs of the network objects based on grouping of multiple network objects and/or metrics determined for the network objects. In some cases, part of determining the topology information 228 at 330 includes automatically grouping network objects having a common function into cluster subsets and service subsets by creating a number of abstraction layers by interpreting low level relations between pairs of the network objects and collapsing functional groups of the network objects into higher level macro-components (e.g., macro cluster 150).

For example, this automatically grouping may include automatically detecting and segmenting macro-components: functional groups such as a micro-service (from that micro-service's low level communication and configuration dependencies) and allowing a grouping of set of resources with a common function (such as a cluster, a scaling group, a micro-service, and the like), and allowing a collapsed and/or expanded view (from an API perspective of the sources 211-216) of these functional groups. Creating the groupings, macro-components, collapsed views and/or expanded views at 330 increases computer efficiency because they can also be used by the object 130 to determine the types of network objects and/or the types of relationships between pairs of the network objects during the period of time.

As noted, the collected TS information 217 at 320 can include metrics data information for each network object, which may be used to determine the timeseries part of the information 228. In some cases, part of determining the topology information 228 at 330 includes time series processor 224 processing the TS part to automatically determine metrics for each network object of information 228. Thus, determining topology information 228 at 330 can include determining if critical metric data is missing for any of the network objects based on the metric data information.

For example, based on the groupings, macro-components, collapsed views and/or expanded views, the object 130 can determine what the critical metrics are for each macro-component and what are the rolled-up individual key performance indicators (KPI) to the macro-component level. Determining the critical metrics and KPI provides a critical capability to a user accessing or displaying a graph representation 230 of the topology information 228 by performing calculations at 330 that are ad-hoc and constantly changing based on the underlying changing resources and configurations of the determined metrics, groupings, macro-components, collapsed views and/or expanded views. For example, a network object that is a service may have the following rolled-up metrics: "Average CPU utilization", "Max CPU utilization", "95th percentile CPU utilization", representing the roll-up of CPU metrics at a time where the number of hosts is constantly changing over time. In one case, the selected network object 110c may have these rolled-up metrics that can be identified in the graph representation 230 while the network objects in the topology information 228 changes in number during the period of time. In some cases, this rolled up information will remain in the data store 222 as prior topology information 228, even after the network objects that were a part of the rolled up result no longer exist in the current topology information 228 (e.g., as they are of an ephemeral nature in clouds or containers). So. the rolled up data can be used as evidence in a troubleshooting process for the selected application 114 even if some of the network objects at the time of a troubling issue are already gone from the current topology information 228. The determining of metrics data of network objects at 330 increases computer efficiency because the metrics data can also be used by the object 130 to determine the types of network objects and/or the types of relationships between pairs of the network objects during the period of time.

After 330, at 340 the topology information 228 of the network objects over the period of time is stored. For example, at 340 the network object 130 may store the topology information 228 received from the processors 224 and 226 in data store 222. The data store 222 can be the storage 514 and/or the memory 512 of FIG. 5. This storing may include the data store 222 storing the processed portion of the collected network CTD information sent by the collector 210; and/or the processed portion of the collected TS information sent by the collector 210. The stored topology information 228 may be sent to the processors 224 and/or 226 as shown by the arrows in FIG. 2 for determining the topology information 228 during the current period of time or a subsequent period of time (e.g., see at 360 of FIG. 3). The stored topology information 228 may be used for displaying a graph representation 230 of the topology information (e.g., also see FIG. 4).

After 340, at 350 a graph representation 230 of the topology information 228 of the network objects over the period of time may optionally be created and/or displayed. The user input/output (I/O) device 170 may be used to select creating and/or displaying one or more of graph representation 230 at 350. This selection may cause the data store 222 and/or the I/O device to access the topology information 228 stored in data store 222 and create a graph representation 230 of some or all of that topology information 228 for one or more points in time during the time period. The selection may also cause the data store 222 and/or the I/O device to display the created graph representation 230 on the display 172.

For example, at 350 a graph representation 230 of the topology information 228 for the network objects related to the selected application 114 for the period of time may be displayed on the display 172. Creating and/or displaying the graph representation 230 increases computer efficiency because it shows a representation of each network object, the unique key of each network object, the types of object of each network object, the groupings of the network objects, the types of relationships between each pair of the network objects, and time data of the network objects in the topology information 228. Here, the "time data" is the time dimension data (e.g., of the connectivity part of the information 228) and optionally, also the timeseries data (e.g., timeseries part of the information 228) of the network objects in the topology information 228. The graph representation 230 may be a two-dimensional or three-dimensional view of the requested part of the topology information 228 that includes a map or graph, or topology interconnection display having: a representation of, unique keys of, type of object of, types of relationships between pairs of, groupings of, and time data of each network object that satisfies the graph representation of topology information 228 requested by the user.

The representation of each object may be an image, symbol, text and/or another indicator that distinctly identifies each network object. For example, FIG. 4 shows the objects as a desktop or server computer symbol, but those symbols are only representations as a network object may actually be any of various types of network objects. The type of object and the types of relationships between each pair of the network objects may be as noted herein. The time data for each network object may be used to show changes in the graph representation 230 and in performance of the objects in that representation over time.

For example, creating and/or displaying at 350 may also show changes in the graph representation 230 of the representation of each object over the period of time. These changes may be based on the changes in time data (e.g., time dimension data and optionally timeseries data) of the topology information 228. Creating and/or displaying the changes in graph representation 230 increases computer efficiency because it allows the user to more easily identify and track changes over time to the topology information 228.

In some cases, the graph representation 230 may be a periodic sequential series over time of the graph representations of the topology information 228 during part or all of the period of time. In some cases, the graph representation 230 may be one or more non-periodic series of the graph representations of the topology information at one or more points in time during the period of time. The user input 174 may be used to select displaying the periodic sequential series and/or non-periodic series of the graph representations of the topology information at one or more points in time during the period of time.

For example, the display 172 or the input 174 may display a time bar having a range from the beginning to the end of the period of time and a slidable location indicator on the time bar that can be located along the period of time by the input 174 (e.g., manipulated by sliding or clicking using a keyboard or mouse) to select displaying the graph representation 230 at/for points in time of the period of time selected using the indicator. The indicator may be slid forward or backward along the period of time to display the changes between a first point in time and a second point in time on the bar. The changes in the graph representation 230 may be shown with marks such as highlighting, shadowing, fading, lightening, darkening, bold, underline, italics and/or the like.

After 350, at decision block 360 it is decided whether process 300 (e.g., 310-360; or optionally only 310-340) will be repeated. If so, process 300 returns to 310 where process 300 repeats for a subsequent period of time, such as where after returning to 310, the period of time referred to in 310-350 is for a subsequent period of time. Here, the original or initial period of time may be referred to as a "first period of time." If process 300 will not be repeated at 360, process 300 ends at 370.

In some cases, process 300 is repeated for between ten and thousands of subsequent periods of time. There may be a delay at 360 between the first period of time during which messages were sampled at 310, and the subsequent period of time during which messages will be sampled at 310 after 360.

Deciding at 360 or causing repeating at 360 may be automatically performed by a scheduler 219 of the collector 210 or performed by a user at the input 174. Selecting the period of time, the subsequent period of time, and a time between an end of the period of time and a beginning of the subsequent period of time may also be automatically performed by the scheduler 219 or performed by a user at input 174.

In one case, the period of time is between 5 and 10 minutes, the subsequent period of time is between 5 and 10 minutes, and the subsequent period of time occurs after each end of a prior period of time, one of periodically having a period that is between 50 to 70 minutes, or randomly between 50 and 70 minutes after each end of a prior period of time. In another case, the period of time is between 2 and 5 minutes, the subsequent period of time is between 2 and 5 minutes, and the subsequent period of time occurs after each end of a prior period of time, one of periodically having a period that is between 10 to 20 minutes, or randomly between 10 and 20 minutes after each end of a prior period of time.

Repeating at 360 may be repeating selecting at 310 and collecting 320 for the at least one subsequent period of time. Repeating selecting and collecting at 360 may cause or include repeating determining at 330 and storing at 340, for the at least one subsequent period of time.

After 360, and repeating 310-340, displaying the graph representation 230 at 350 may include displaying changes between topology information for the period of time and topology information for the subsequent period of time as noted at 360. Displaying the changes may optionally include graphically identifying where changes in the graph representation 230 and/or the topology information 228 have occurred between the period of time and the subsequent period of time with marks as noted at 350.

The user input 174 may be used to select displaying the graph representation 230 of the topology information at a point in time during the period of time, and a further graph representation of the change between topology information for that point and time, and a) another point in time during the period of time, or b) a subsequent point in time during the subsequent period of time. In some cases, the input 174 may be used to select sequentially displaying the graph representation for a point in time and a further point and time during the period of time, and/or a subsequent point in time during the subsequent period of time.

For example, FIG. 4 shows a graph representation 400 of topology information of network objects of the computer communication network 100 for the selected application executing 114 on the selected network object 110*c* for a (e.g., a first) period of time. The graph representation 400 may be the graph representation 230 of the topology information 228 at a point in time during the (e.g., first) period of time at 360 of FIG. 3.

The graph representation 400 for the software application 114 shows the network object 110*b*, the network object 110*c* (the object where application 114 is executing and communicating from), the network object 110*d*, network object 110*e*, the cloud objects 140 and the cluster of objects 150. The network object 110*b* is connected to the network object 110*d*. In other words, the application 114 and/or the network object 110*c* is communicating with each of the network object 110*b*, the network object 110*d*, network object 110*e*, the cloud (or grouping) objects 140 (which include the network objects 110*f* and 110*g*) and the network object 110*i* of the cluster of objects 150 which is connected to the network object 110*h* of the cluster (or grouping) of objects 150. It is noted that the network object 110*a* of the network 100 is not included in the graph representation 400, because it is not part of the topology information 228 at the point in time (e.g., during the period of time) selected for the display of the graph representation 400.

For each of these network objects, the graph representation 400 shows a graph representation of that network object; the unique key of that network object; the type of object of that network object; the types of relationships between that object and each network object connected to that object, the groupings for that network object, and time data for that network object. The time data may be a change of the graph representation over time and/or a change of a showing of the metrics data for each of the objects over time. For example, some objects may be removed from and/or added to the representation; and/or small windows may be displayed next to each of the objects showing one or more metrics data for each object may be displayed.

Specifically, the graph representation 400 shows an image of a desktop or server computer for each network object a rectangle and a label for the groupings for each group of the network objects; and lists text representing each network object's unique key, type; relationships and time data for each of: the network object 110*b*, the network object 110*c*, the network object 110*d*, network object 110*e*, the cloud objects 140 and the cluster of objects 150. The image of a desktop or server computer is only used representatively as the type of network object of each network object may vary widely as noted herein.

As noted at 350 of FIG. 3 the graph representation 230 and/or the topology information 228 may change over time. For instance, the input 174 may be used to select one or more of the graph representations 230 to be displayed for various points in time during period of time and/or during a subsequent period of time.

Displaying the representation 400 may be selected using user the input 174, such as described herein. Notably, an indicator on the display 172 may be slid forward along a time bar including the period of time and subsequent period of time to show the representation for a subsequent period of time and the changes therein.

Creating and/or displaying the representation 400 increases computer efficiency because it provides an efficient way of combining graph data with time dimension data and timeseries data for highly efficient access time for specific queries that are applicable for network management.

Figure 5:
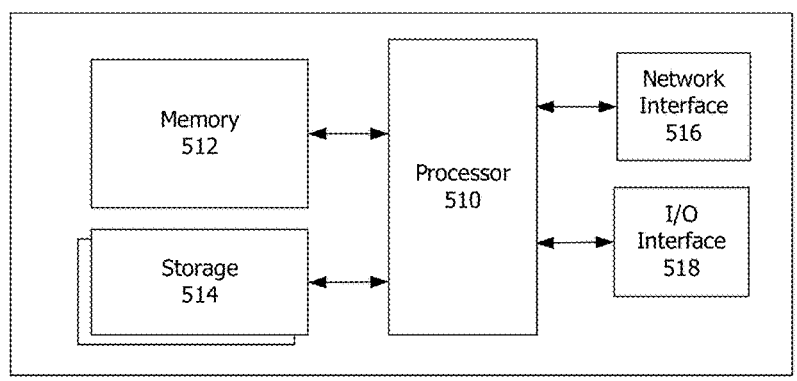
FIG. 5 is a block diagram of a computing device.

FIG. 5 is a block diagram of a computing device 500. The computing device 500 may be representative of the system 102, the I/O device 170, the server 130*a*, the object 120 and/or the object 130, herein. The computing device 500 may be a desktop or laptop computer, a server computer, a client computer, a network router, a network node, a network switch, a tablet, a smartphone or other mobile device. In some cases, it is a network object or element as described herein. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a system of two physical network objects may provide continual automated discovering of the topology information of network objects for a selected executing application.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. It may be internal or external storage. The storage 514 may take the form of a magnetic or solid-state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid-state memory devices, the memory 512 and storage 514 may be a single device.

The network interface 516 includes an interface to a network such as a network that can be used to communicate calls, signals, streams, arrays, flagged samples and feedback described herein. The network interface 516 may be wired or wireless.

The I/O interface 518 interfaces the processor 510 to peripherals (not shown) such as displays, video and still cameras, microphones, keyboards and USB devices.

In some cases, storage 514 is a non-volatile machine-readable storage medium that includes all types of computer readable media, including magnetic storage media, optical storage media, and solid-state storage media. It should be understood that the software can be installed in and sold with the system 102, the object 120 and/or the object 130. Alternatively, the software can be obtained and loaded into the system 102, the object 120 and/or the object 130, including obtaining the software via a disc medium or from any manner of network or distribution system, including from a server owned by the software creator or from a server not owned but used by the software creator. The software can be stored on a server for distribution over the Internet.

Some technologies described for the system 102, the object 120 and/or the object 130 may include numerous units including a collector unit for selecting a portion of a set of data messages being or that have been sent over a period of time by an application executing on a selected physical network object of the plurality of physical network objects; and for collecting network configuration information and time dimension (CTD) information, and timeseries (TS) information for the portion of data messages from source units. The source units may include a metrics source unit for detecting metrics and timeseries data of the network objects; a configuration source unit for detecting the unique keys, IP addresses, configuration information of the network objects and for detecting the types of objects of the network objects; a flow logs source unit for detecting IP addresses of the network objects, types of relationships between pairs of the network objects and for detecting the time dimension data for the network objects; and the configuration source and flow logs source unit for obtaining IP addresses and/or unique keys of network objects not identified in data messages based on the type of the network object not identified in a first subset of data messages. The collector unit may also be for sending the collected network CTD and TS information to a time series processor unit and a connectivity processor unit. The time series processor unit and a connectivity processor unit may be for determining topology information of the physical network objects over the period of time based on the received/collected network CTD and TS information. The topology information may include unique keys of the physical network objects, types of objects of the physical network objects, types of relationships between pairs of the physical network objects, time dimension data for the physical network objects and timeseries data of the network objects. The units may also include a data store unit for storing the topology information. The data store unit may also create and display a graph representation of the topology information.

The technologies described herein provide various technological improvements to computer performance and efficiently. For example, the system 102, the object 120, the object 130, the process 300, and/or the computing device 500 provide a much more accurate and efficient device (and process) for displaying a graph representation of a topology over time for an application executing on a computer communication network. For example, the technologies described are technological improvements over those of the past because they can accurately, automatically and continually over time, discover topology information and display graph representations of the topology for an application executing on a computer communication network by: selecting to collect network configuration information and time dimension (CTD) information, and timeseries (TS) information from only a portion of a set of data messages being sent over a period of time by a selected application executing on a network object of a computer network and possibly other network objects having a relationship with the selected application; determining topology information of the physical network objects over the period of time based on the collected network CTD and TS information; and displaying a graph representation of the topology information as it changes over time that includes unique keys of the physical network objects, types of objects of the physical network objects, types of relationships between pairs of the physical network objects, time dimension data for the physical network objects and timeseries data of the network objects. Prior technologies do have such improvements.

More particularly, the technologies described provide computer network topology mapping tools, systems and/or devices that automatically discover the topology of network objects of a network communicating with a selected application at a large scale, store the topology and allow quick access to the topology information in a graphical display. The technologies described do not require access to sensitive information, or administrator or root level permissions. They perform repeated discovery over time, compare changes, address large scale topologies and deal with missing critical data. They also automatically group resources (like a cluster or a service) and collect critical metrics for each network object. The technologies described also provide a graph representation of the topology that mixes data that is not pure graphical and data that has a time dimension.

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 516, or within a common FPGA, ASIC, or other circuit device.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The system 102, the object 120 and/or the object 130 may include a comparator unit and/or a model unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for continual automated discovering of topology information of a computer network over a period of time comprising:
   a first physical network object of a plurality of physical network objects of the network for:
   A) selecting a first portion of a first set of data messages being sent over the period of time by a first application executing on a selected physical network object of the plurality of physical network objects;
   B) collecting first network configuration information and time dimension (CTD) information, and time-series (TS) information from the first portion of data messages;
   C) sending to a second physical network object, all or a portion of the collected first network CTD and TS dimension information; and the second physical network object of the plurality of physical network objects for:
   D) determining topology information of the physical network objects over the period of time based on the collected first network CTD and TS information; the topology information including unique keys of the physical network objects, types of objects of the physic al network objects, types of relationships between pairs of the physic al network objects, and time dimension data for each of the physical network objects for the period of time based on the collected network CTD information, and timeseries data for each of the physical network objects for the period of time based on the collected TS information; and
   E) storing the first topology information in a memory.

2. The system of claim 1, further comprising:
   the first physical network object of a plurality of physical network objects of the network for:
   F) selecting a second portion of a second set of data messages being sent over the period of time by a second application executing on a related physical network object of the plurality of physical network objects, the second application having a communication relationship with the first application;
   G) collecting second network CTD and TS information from the second portion of data messages;
   H) sending to the second physical network object, all or a portion of the collected second network CTD and TS information; and
   the second physical network object of the plurality of physical network objects for:
   I) determining the topology information of the physical network objects over the period of time based on the collected first and second network CTD and TS information.

3. The system of claim 2, wherein the second physical network object comprises:
- a connectivity processor for:
  - determining the unique keys of the physical network objects, the types of objects of the physical network objects, and the types of relationships between pairs of the physical network objects, and time dimension data for the physical network objects based on the collected first and second network CTD; and
- a time series processor for determining the timeseries data for the physical network objects based on the collected first and second TS information.

4. The system of claim 1, wherein the first physical network object comprises a scheduler for:
- repeating A)-E) for at least one subsequent period of time; and
- selecting one of:
  - a) the period of time is between 5 and 10 minutes, the subsequent period of time is between 5 and 10 minutes, and the subsequent period of time occurs after each end of a prior period of time, one of periodically having a period that is between 50 to 70 minutes, or randomly between 50 and 70 minutes after each end of a prior period of time; or
  - b) the period of time is between 2 and 5 minutes, the subsequent period of time is between 2 and 5 minutes, and the subsequent period of time occurs after each end of a prior period of time, one of periodically having a period that is between 10 to 20 minutes, or randomly between 10 and 20 minutes after each end of a prior period of time; or
  - the period of time, the subsequent period of time, and a time between an end of the period of time and a beginning of the subsequent period of time based on a type of software of the application.

5. The system of claim 1, wherein the network further comprises virtual network objects; and
- wherein determining includes determining topology information of the virtual network objects over the period of time based on the collected first network CTD and TS information; the topology information including unique keys of the virtual network objects, types of objects of the virtual network objects, types of relationships between pairs of the virtual network objects, types of relationships between pairs of the virtual and physical network objects, time dimension data for the virtual network objects, and timeseries data for each of the physical network objects.

6. The system of claim 5, wherein first physical network object comprises a collector for:
- selecting the first portion by:
  - parsing the set of data messages based on at least one statistical analysis that identifies trends in data message flow direction and convergence between the network objects;
  - selecting the portion of the set of data messages based on the trends;
  - selecting the portion as between 2 and 10 percent of the set of data messages of the software application executing on the selected physical network object; and
- collecting the first network CTD and TS information by:
  - remotely accessing the selected physical network object;
  - reading communication flow logs of the selected physical network object, each flow log associated with a data message received or transmitted by the selected physical network object;
  - wherein the flow logs identify a source network object IP address, a target network object IP address and a type of communication for at least some of the data messages.

7. The system of claim 5, wherein the first network object includes a plurality of pluggable application program interfaces (API) sources for collecting the first network CTD and TS information; and the pluggable sources including metrics sources for detecting metrics of the network objects; configuration sources for detecting the unique keys of the network objects and for detecting the types of objects of the network objects; and flow logs sources for detecting types of relationships between pairs of the network objects and for detecting the time dimension data for the network objects;
- wherein the flow log source is further for identifying a source network object IP address and a target network object IP address for a first subset of the portion of data messages, and for sending the identified IP addresses for the first subset to the at least one second network object;
- wherein the configuration source is for obtaining IP addresses of network objects not identified in the first subset by detecting the type of the network object of the source network object and the target network object having IP addresses not identified in the first subset, and for sending the obtained IP addresses to the at least one second network object; and
- the second network object is for maintaining a list of IP addresses of the network objects and determining if an IP address of a network object changes over time based on the received identified IP addresses and obtained IP addresses.

8. The system of claim 5, further comprising the first network object for:
- reading the first network CTD and TS information from communication flow logs of the selected physical network object;
- time stamping the read first network CTD and TS information;
- creating statistics about the time stamped first network CTD and TS information;
- filtering the time stamped first network CTD and TS information based on the statistics to remove redundant information; and
- transmitting the filtered first network CTD and TS information to the at least one second network object.

9. The system of claim 5,
- wherein the types of physical network objects include physical hosts, physical disks;
- wherein the types of virtual network objects include logical clustered groups of resources, and logical services;
- wherein the types of relationships include a network object controlling actions performed by another network object, a network object communication with another network object, a network object depending on another network object in order to operate correctly, and a network object streaming data to another network object;
- wherein determining the topology information includes automatically grouping network objects having a common function into cluster subsets and service subsets; and wherein the automatically grouping includes creating a number of abstraction layers by interpreting low level relations between pairs of the network objects and collapsing functional groups of the network objects into higher level macro-components; and wherein some of the higher level macro-component have rolled-up values, key performance indicators (KPI) and time series of internal components; and wherein the network first TS information includes critical metric data information for each network object, and wherein determining topology information includes determining if critical metric data is missing for any of the network objects based on the critical metric data information.

10. The system of claim 5, wherein the second network object further comprises a user input/output device for:

displaying a graph representation of the topology information for the period of time including a) a map showing a representation of each physical network object, the types of objects of each physical network object, the types of relationships between each pair of the physical network objects, and time dimension data for each of the physical network objects for the period of time based on the collected network CTD information, and b) timeseries data for each of the physical network objects for the period of time based on the collected TS information; and selecting various points in time during period of time at which to display the changing representation.

11. A method of continual automated discovering of a topology information of a computer network over a period of time comprising:

A) selecting a first portion of a first set of data messages being sent over the period of time by a first application executing on a selected physical network object of the plurality of physical network objects;

B) collecting first network configuration information and time dimension (CTD) information, and timeseries (TS) information from the first portion of data messages;

C) determining topology information of the physical network objects over the period of time based on the collected first network CTD and TS information; the topology information including unique keys of the physical network objects, types of objects of the physical network objects, types of relationships between pairs of the physical network objects, and time dimension data for each of the physical network objects for the period of time based on the collected network CTD information, and timeseries data for each of the physical network objects for the period of time based on the collected TS information; and D) storing the topology information: and E) repeating A-D for at least one subsequent period of time.

12. The method of claim 11, further comprising:

F) selecting a second portion of a second set of data messages being sent over the period of time by a second application executing on a related physical network object of the plurality of physical network objects, the second application having a communication relationship with the first application;

G) collecting second network CTD and TS information from the second portion of data messages;

H) sending to the second physical network object, all or a portion of the collected second network CTD and TS information; and I) determining the topology information of the physical network objects over the period of time based on the collected first and second network CTD and TS information.

13. The method of claim 11, further comprising selecting one of:

a) the period of time is between 5 and 10 minutes, the subsequent period of time is between 5 and 10 minutes, and the subsequent period of time occurs after each end of a prior period of time, one of periodically having a period that is between 50 to 70 minutes, or randomly between 50 and 70 minutes after each end of a prior period of time; or b) the period of time is between 2 and 5 minutes, the subsequent period of time is between 2 and 5 minutes, and the subsequent period of time occurs after each end of a prior period of time, one of periodically having a period that is between 10 to 20 minutes, or randomly between 10 and 20 minutes after each end of a prior period of time.

14. The method of claim 11, wherein the network further comprises virtual network objects; and wherein determining includes determining topology information of the virtual network objects over the period of time based on the collected first network CTD and TS information; the topology information including unique keys of the virtual network objects, types of objects of the virtual network objects, types of relationships between pairs of the virtual network objects, types of relationships between pairs of the virtual and physical network objects, time dimension data for the virtual network objects, and timeseries data for each of the physical network objects.

15. The method of claim 14, wherein:

the selecting the first portion includes:

parsing the set of data messages based on at least one statistical analysis that identifies trends in data message flow direction and convergence between the network objects;

selecting the portion of the set of data messages based on the trends;

selecting the portion as between 2 and 10 percent of the set of data messages of the software application executing on the selected physical network object; and the collecting includes:

remotely accessing the selected physical network object;

reading communication flow logs of the selected physical network object, each flow log associated with a data message received or transmitted by the selected physical network object;

wherein the flow logs identify a source network object IP address, a target network object IP address and a type of communication for at least some of the data messages; and wherein the collected first network CTD and TS information is based on the flow logs.

16. The method of claim 14, wherein:

the collecting includes a plurality of pluggable application program interfaces (API) sources reading data from the selected physical network object; the pluggable sources including:

metrics sources for detecting metrics of the network objects;

a configuration source for detecting the IP address of the network objects and for detecting the types of objects of the network objects;

a flow logs source for detecting the IP address of the network objects, detecting types of relationships between pairs of the network objects and for detecting the time dimension data for the network objects; and the determining the topology information includes:

maintaining a list of IP addresses of the network objects during the period of time based on the network CTD and TS information; and determining if the IP addresses of the network objects changes over time based on list of IP addresses.

17. The method of claim 14, wherein the collecting includes:

reading the first network CTD and TS information from communication flow logs of the selected physical network object;

time stamping the read first network CTD and TS information;

creating statistics about the time stamped first network CTD and TS information;

filtering the time stamped first network CTD and TS information based on the statistics to remove redundant information.

18. The method of claim 14, wherein the types of network objects include physical hosts, physical disks, logical clustered groups of resources, and logical services;

wherein the types of relationships include a network object controlling actions performed by another network object, a network object communication with another network object, a network object depending on another network object in order to operate correctly, and a network object streaming data to another network object;

wherein the determining the topology information includes automatically grouping network objects having a common function into cluster subsets and service subsets; and wherein the automatically grouping includes creating a number of abstraction layers by interpreting low level relations between pairs of the network objects and collapsing functional groups of the network objects into higher level macro-components; and wherein some of the higher level macro-component have rolled-up values, key performance indicators (KPI) and time series of internal components; and wherein the network first TS information includes critical metric data information for each network object, and wherein determining topology information includes determining if critical metric data is missing for any of the network objects based on the critical metric data information.

19. The method of claim 11, further comprising:

displaying a graph representation of the topology information for the period of time including a) a map showing a representation of each physical network object, the types of objects of each physical network object, the types of relationships between each pair of the physical network objects, and time dimension data for each of the physical network objects for the period of time based on the collected network CTD information, and b) timeseries data for each of the physical network objects for the period of time based on the collected TS information.

20. The method of claim 19, further comprising:

displaying a graph representation of changes over time during the period of time of the topology information that shows a representation of each network object, the types of objects of each network object, the types of relationships between each pair of the network objects, and time data for the network objects; and receiving at an input/output device a selection of various points in time during period of time at which to display the changing representation.

* * * * *